United States Patent
Eden et al.

(10) Patent No.: US 10,337,491 B2
(45) Date of Patent: Jul. 2, 2019

(54) WIND TURBINE AND A LIGHTNING PROTECTION UNIT FOR A WIND TURBINE

(71) Applicant: Wobben Properties GmbH, Aurich (DE)

(72) Inventors: Georg Eden, Westerholt (DE); Florian Sartorius, Leer (DE)

(73) Assignee: Wobben Properties GmbH, Aurich (DE)

( * ) Notice: Subject to any disclaimer, the term of this patent is extended or adjusted under 35 U.S.C. 154(b) by 599 days.

(21) Appl. No.: 14/890,090

(22) PCT Filed: May 8, 2014

(86) PCT No.: PCT/EP2014/059503
§ 371 (c)(1),
(2) Date: Nov. 9, 2015

(87) PCT Pub. No.: WO2014/184094
PCT Pub. Date: Nov. 20, 2014

(65) Prior Publication Data
US 2016/0084232 A1    Mar. 24, 2016

(30) Foreign Application Priority Data
May 14, 2013 (DE) .................. 10 2013 208 792

(51) Int. Cl.
| H02H 7/24 | (2006.01) |
| F03D 11/00 | (2006.01) |
| F03D 1/06 | (2006.01) |
| F03D 80/30 | (2016.01) |
| F03D 80/80 | (2016.01) |

(52) U.S. Cl.
CPC ............ *F03D 1/0675* (2013.01); *F03D 80/30* (2016.05); *F03D 80/80* (2016.05); *Y02E 10/721* (2013.01); *Y02E 10/726* (2013.01)

(58) Field of Classification Search
CPC ....... F03D 11/0033; F03D 80/30; F03D 80/80
See application file for complete search history.

(56) References Cited

U.S. PATENT DOCUMENTS

| 6,407,900 B1 | 6/2002 | Shirakawa et al. |
| 6,932,574 B2 | 8/2005 | Wobben |
| (Continued) | | |

FOREIGN PATENT DOCUMENTS

| DE | 44 36 197 C2 | 9/1998 |
| DE | 10 2004 022 299 A1 | 12/2005 |
| (Continued) | | |

*Primary Examiner* — Kayla McCaffrey
(74) *Attorney, Agent, or Firm* — Seed Intellectual Property Law Group LLP

(57) ABSTRACT

A wind turbine is provided, having a nacelle, and having a rotor that has at least two rotor blades. The rotor blades each have a rotor blade root, at least one metallic conductor, for conducting a lightning strike, and connected thereto, provided in the region of a rotor blade root, have a conducting ring. In addition, a lightning protection unit is fastened to the non-rotating part of the nacelle in such a manner that the lightning protection unit lies on the ring. The lightning protection unit has two rollers and a lightning rod, a free end of the lightning rod being separated from an outer end of the rollers by a distance that defines a spark gap.

4 Claims, 2 Drawing Sheets

(56) References Cited

U.S. PATENT DOCUMENTS

| | | |
|---|---|---|
| 2012/0039011 A1 | 2/2012 | Thiel et al. |
| 2013/0100570 A1* | 4/2013 | Lyngby .................... H02H 7/24 361/117 |
| 2013/0181457 A1* | 7/2013 | Lyngby .................... H01T 4/08 290/55 |

FOREIGN PATENT DOCUMENTS

| | | |
|---|---|---|
| DE | 10 2009 017 824 A1 | 10/2010 |
| EP | 1 561 030 B1 | 11/2003 |
| EP | 1 788 241 A2 | 5/2007 |
| JP | 2000265938 A | 9/2000 |
| JP | 2003-532836 A | 11/2003 |
| RU | 37155 U1 | 4/2004 |
| RU | 2309290 C1 | 10/2007 |
| RU | 2325552 C1 | 5/2008 |
| TW | 200912131 A | 3/2009 |
| TW | 201018780 A | 5/2010 |

* cited by examiner

WIND TURBINE AND A LIGHTNING PROTECTION UNIT FOR A WIND TURBINE

BACKGROUND

Technical Field

The present invention relates to a wind turbine and to a lightning protection unit for a wind turbine.

Description of the Related Art

When wind turbines are installed in open terrain, this, combined with their great overall height, inevitably involves the risk of lightning strike.

DE 44 36 197 C2 discloses a wind turbine having a lightning protection means. To enable lightning to be safely diverted, an aluminium ring, made of a conducting material, is provided in the region close to the root of the rotor blade. A lightning rod, disposed at a predefined distance from the metal rings, is provided on a stationary part of the nacelle. When lightning strikes, the lightning can overcome the spark gap between the ring and the lightning rod, and thus be diverted.

EP 1 561 030 B1 likewise discloses a lightning protection means for a wind turbine. In this case, likewise, a conducting ring is provided in the region close to the root of the rotor blade. A sliding contact connection is provided parallel to the spark gap.

DE 10 2009 017 824 A1 discloses a transmission device for transmitting electrostatic energy and lightning current between a rotor shaft and a non-rotating earthing device. The transmission device has a sliding-action contact device, an electrode for transmitting lightning current, and two rollers.

BRIEF SUMMARY

One or more embodiments of the present invention are directed to provide a wind turbine having an improved lightning protection means.

A wind turbine is provided, having a nacelle, and having a rotor that has at least two rotor blades. The rotor blades each have at least one metallic conductor, for conducting a lightning strike, and connected thereto, in the region of a rotor blade root, have a conducting ring. In addition, a lightning protection unit is fastened to the non-rotating part of the nacelle in such a manner that the lightning protection unit lies on the ring on the rotor blade. The lightning protection unit has two non-conducting rollers and a lightning rod, a free end of the lightning rod being separated from an outer end of the rollers by a distance that defines a spark gap. Thus, only the rollers of the lightning protection unit lie on the ring.

According to an aspect of the present invention, the lightning protection unit has a rocker unit that is fastened to a non-rotating part of the nacelle via a springing plate.

The invention likewise relates to a lightning protection unit for a wind turbine. The lightning protection unit has a springing plate that can be fastened at one end to a non-rotating part of the nacelle of the wind turbine. The lightning protection unit additionally has a rocker unit that is fastened to a second end of the spring plate. In addition, the lightning protection unit has two non-conducting rollers that are coupled to the rocker unit. Furthermore, the lightning protection unit has a lightning rod that is coupled to the rocker unit. A free end of the lightning rod is separated from the outer end of the rollers by a distance in such a manner that it defines a spark gap, such that only the rollers are in contact with a ring on the rotor blade.

The present invention relates to the concept of providing, instead of a lightning rod, a lightning protection means or unit that at any given time provides a defined distance between a conducting ring, in the region close to the root of the rotor blade, and a lightning diverter. This is achieved in that the lightning protection means has a rocker, having two rollers made of a non-conducting material, the rollers being in contact with the conducting ring in the region close to the root of the rotor blade. The distance of the lightning diverter and the rollers can thus be used to set a defined distance between the lightning diverter and the non-conducting ring on the rotor blade. Consequently, a defined distance between the conducting ring and a lightning rod (i.e., the width of the spark gap) can be provided even for rotor blades that are not round. The defined distance can be used to select a smaller spark gap.

According to an aspect of the present invention, the lightning protection means according to the invention can be retrofitted.

Further designs of the invention constitute subject-matter of the dependent claims.

BRIEF DESCRIPTION OF THE SEVERAL VIEWS OF THE DRAWINGS

Advantages and exemplary embodiments of the invention are explained in greater detail in the following with reference to the drawings.

DETAILED DESCRIPTION

Figure 1:
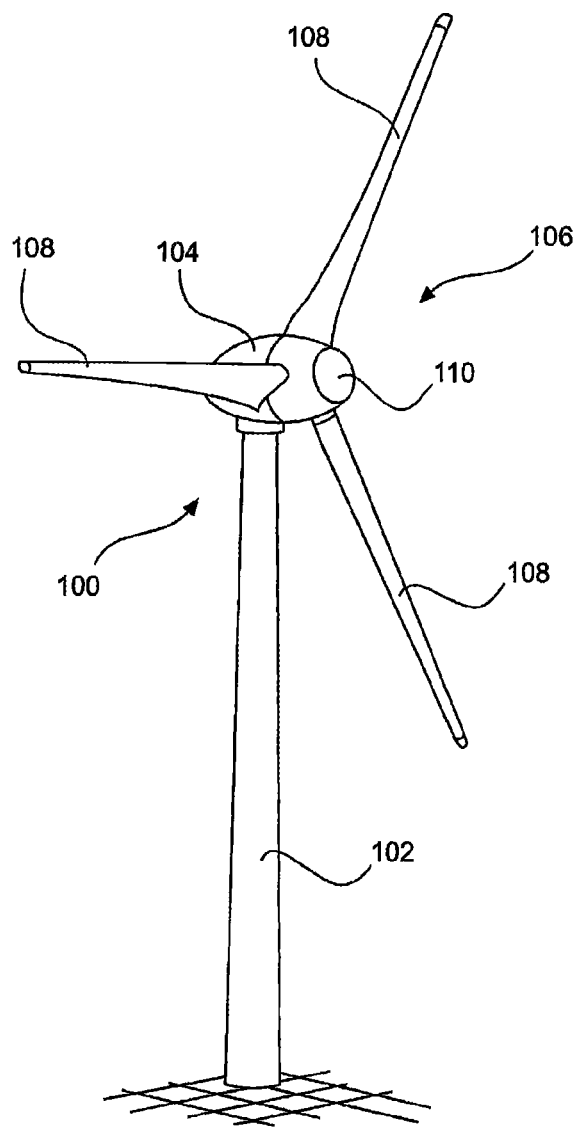
FIG. 1 shows a schematic representation of a wind turbine according to the invention.

FIG. 1 shows a schematic representation of a wind turbine according to the invention. The wind turbine 100 has a tower 102 and a nacelle 104. A rotor 106, having three rotor blades 108 and a spinner 110, is provided on the nacelle 104. When in operation, the rotor 106 is put into a rotary motion by the wind, and thus also rotates the rotor of the generator in the nacelle 104. The pitch angle of the rotor blades 108 can be altered by pitch motors at the blade roots of the respective rotor blades 108.

Figure 2:
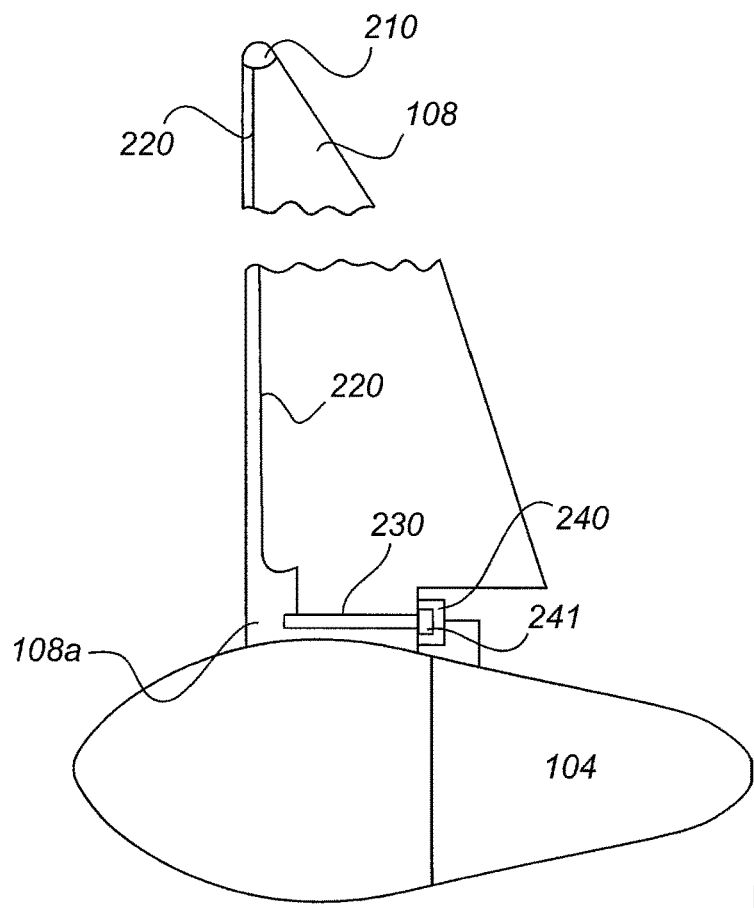
FIG. 2 shows a schematic representation of a part of the wind turbine according to a first exemplary embodiment.

FIG. 2 shows a schematic representation of a part of the wind turbine according to a first exemplary embodiment. The rotor blade 108 optionally has a metallic tip 210, and has at least one metallic conductor 220 that connects the rotor blade tip 210 to a metallic ring 230. The metallic ring 230 is provided in the rotor-blade root region 108a. The ring 230 can at least partially encompass the rotor blade 108, such that, even if the pitch angle of the rotor blade 108 is changed, it can be ensured that the conducting ring 230 is in contact with the lightning protection unit 240. The lightning protection unit 240 is fastened to the stationary part of the nacelle 104, and is in contact with the metallic (conducting) ring 230.

Figure 3:
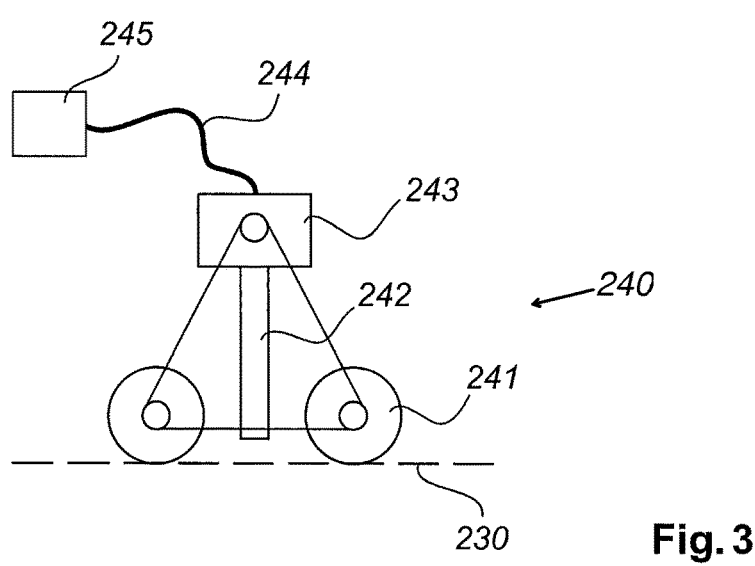
FIG. 3 shows a schematic representation of a lightning protection unit according to the first exemplary embodiment.

FIG. 3 shows a schematic representation of a lightning protection unit 240 according to the first exemplary embodiment. The lightning protection unit 240 can be directly or indirectly fastened to a stationary part 245 of the nacelle 104 via a springing plate 244. Optionally provided at one (free) end of the springing plate 244 is a rocker unit 243 that, in turn, is connected to two movable rollers 241. A lightning rod 242 is provided between the rollers 241. Between the free end of the lightning rod 242 and the ends of the rollers 241 there is distance, which can be determined in advance, or set. The rollers 241 are brought into contact with the ring 230, such that the spark gap between the ring 230 and the free end of the lightning rod 242 is defined. Since the rollers 241 are pressed against the conducting ring 230, because of the springing plate 244, there is a defined distance (the spark gap) between the ring 230 and the lightning rod 242.

The rollers 241 are preferably made of a non-conducting material such as, for example, plastic or Teflon. The width of the rollers 241 may be, for example, 20 cm.

Owing to the provision of the rocker unit 243, which can be pivoted in respect of the second end of the plate 244, it can be ensured that both rollers 241 lie on the ring 230 at any given time.

The lightning protection unit according to the invention, in particular the pivotable rocker unit, makes it possible to ensure a defined distance between the lightning rod 242 and the conducting ring 230, even if the ring 230 or the rotor blade 108 is not round.

The invention claimed is:

1. A wind turbine, comprising:
    a nacelle having a rotor and a non-rotating part;
    a plurality of rotor blades coupled to the rotor, each of the plurality of rotor blades having a rotor blade root, at least one metallic conductor for conducting a lightning strike, and a conducting ring at the rotor blade root; and
    at least one lightning protection unit having a springing plate and a rocker unit, wherein the rocker unit is fastened to the non-rotating part of the nacelle by the springing plate, wherein the at least one lightning protection unit lies on the conductive rings of the rotor blades in order to divert lightning that strikes the rotor blades, respectively, the at least one lightning protection unit having two rollers and a lightning rod, a free end of the lightning rod being separated from an outer end of the rollers by a distance that defines a spark gap.

2. The wind turbine according to claim 1,
    wherein the distances between the free end of the lightning rods and the outer end of the rollers are adjustable.

3. The wind turbine according to claim 1, wherein the rollers are made from an electrically non-conductive material.

4. A lightning protection unit for a wind turbine, the lightning protection unit comprising:
    a springing plate fastened at a first end to a non-rotating part of a nacelle of the wind turbine;
    a rocker unit disposed at a second end of the springing plate;
    two rollers made of insulating material that are coupled to the rocker unit; and
    a lightning rod that is coupled to the rocker unit, a free end of the lightning rod being separated from outer ends of the rollers by a distance that defines a spark gap.

* * * * *